US011348084B2

(12) United States Patent
Doherty et al.

(10) Patent No.: US 11,348,084 B2
(45) Date of Patent: May 31, 2022

(54) ENTITY RECOGNITION SYSTEM

(71) Applicant: BANK OF AMERICA CORPORATION, Charlotte, NC (US)

(72) Inventors: Daniel James Doherty, Huntersville, NC (US); Riaz H. Bhamani, Waxhaw, NC (US); Matthew Edward Carroll, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 77 days.

(21) Appl. No.: 16/673,402

(22) Filed: Nov. 4, 2019

(65) Prior Publication Data
US 2021/0133718 A1 May 6, 2021

(51) Int. Cl.
G06Q 20/20 (2012.01)
G06Q 20/40 (2012.01)

(52) U.S. Cl.
CPC ......... G06Q 20/206 (2013.01); G06Q 20/204 (2013.01); G06Q 20/208 (2013.01); G06Q 20/40145 (2013.01)

(58) Field of Classification Search
CPC .. G06Q 20/206; G06Q 20/204; G06Q 20/208; G06Q 20/40145
USPC .......................................................... 705/18
See application file for complete search history.

(56) References Cited

U.S. PATENT DOCUMENTS

| 7,483,858 | B2 | 1/2009 | Foran et al. | |
|---|---|---|---|---|
| 7,600,692 | B2 * | 10/2009 | Call | G06Q 10/00 235/375 |
| 7,766,223 | B1 * | 8/2010 | Mello | G06Q 20/40145 235/379 |
| 8,160,935 | B2 | 4/2012 | Bui | |
| 8,577,730 | B2 | 11/2013 | Gonzalez Loyo | |
| 2004/0111370 | A1 * | 6/2004 | Saylors | G06Q 20/10 705/40 |
| 2011/0276479 | A1 | 11/2011 | Thomas | |
| 2013/0297398 | A1 | 11/2013 | Brown et al. | |
| 2014/0164083 | A1 | 6/2014 | Wilkes | |

(Continued)

OTHER PUBLICATIONS

Electronic Payment Systems, 1997 (Year: 1997).*

Primary Examiner — Florian M Zeender
Assistant Examiner — Nicole Elena Bruner
(74) Attorney, Agent, or Firm — Moore & Van Allen PLLC; Jeffrey R. Gray

(57) ABSTRACT

A direct interaction network in which resources are more efficiently transferred between entities having resource pools with the same organization. The interaction network may be implemented by transforming a user computer system into the interaction terminal for the interaction such that the provider entity does not require interaction terminals to enter into interactions. Alternatively, the interaction network may be entered through interaction terminals of the provider entity without the user having a user computer system and without the user providing a physical instrument for the interaction. These implementations may be possible due at least in part to being able to determine that the entity resource pools are administered by the same organization. Furthermore, one or more sensors may be utilized with the user computer system and/or interaction terminals in order to determine the presence or identity of a user, and/or the subject of the interaction.

20 Claims, 3 Drawing Sheets

(56) References Cited

U.S. PATENT DOCUMENTS

| | | | | |
|---|---|---|---|---|
| 2014/0213344 A1* | 7/2014 | Rose | ............... | G06Q 20/363 |
| | | | | 463/25 |
| 2016/0018914 A1 | 1/2016 | Kuo et al. | | |
| 2017/0337602 A1 | 11/2017 | Davis | | |
| 2019/0230070 A1* | 7/2019 | Isaacson | ............. | G07G 1/0036 |
| 2021/0133703 A1* | 5/2021 | Doherty | ............... | G06Q 20/085 |

* cited by examiner

ENTITY RECOGNITION SYSTEM

FIELD

The present invention relates to a direct resource distribution platform, and more particularly to a direct interaction network through which resources can be distributed in a way that improves processing speeds and reduces memory requirements.

BACKGROUND

Resource processing for interactions typically requires a chain of various systems and entities in order to provide entry points for authorization, collection of resources, movement of resources along processing rails, gateways for network communications, or the like, which all require large amounts of processing capacity and memory storage in order to allow for such resource processing, and potential return processing. It is difficult for entities, and more particularly, small entities, to build out the infrastructure to allow for such resource processing.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer implemented methods, and computer products are described herein for a resource distribution system that improves the processing speeds, memory storage, security, and reduces costs associated with processing resources related to interactions. In the present disclosure, the system creates a direct interaction network, wherein at least one resource pool source of the user (e.g., user resource pool) and at least one resource pool destination of a product provider (e.g., provider resource pool) are administered by the same organization. As such, the direct resource distribution network may be controlled by a single organization, which forms an internal resource transfer processing network. As such, resources associated with interactions may be distributed directly between the resource pools of the members within the direct resource distribution network without having to use the traditional processing networks (e.g., which have a number of issues related to processing times, memory, cost, or the like).

Moreover, the systems, computer implemented methods, and computer products described herein for entering interactions may be implemented by transforming the user computer system into the interaction terminal for the interaction such that the product provider does not need interaction terminals. Alternatively, in some implementations the interactions may be entered through interaction terminals of the product provider without the user having a user computer system and without the user providing a physical instrument for the interaction. These implementations may be possible due at least in part to being able to determine that the user resource pool and the provider resource pool are administered by the same organization. Furthermore, the systems, computer implemented methods, and computer products may utilize one or more sensors that may determine the identity of the user and/or product information related to interaction.

Embodiments of the invention comprise direct resource distribution systems, methods, and computer program products for transferring resources between entities. The invention comprises identifying a user based on a physical indication of the user, wherein the physical indication is captured by an interaction terminal. The invention further comprises receiving an indication that the user is interested in an interaction with a product provider and authenticating the user based on the physical indication of the user. The invention further comprises identifying the user has a user resource pool and the product provider has a provider resource with an organization that administers the user resource pool and the provider resource pool and allowing completion of the interaction directly by transferring resources between the user resource pool and the provider resource pool.

In further accord with embodiments of the invention, identifying the user is interested in an interaction with the product provider comprises receiving product information captured from a product scanned using the interaction terminal.

In other embodiments of the invention, identifying the user is interested in the interaction with the product provider comprises receiving product information from a product. In still other embodiments of the invention, the product information is captured from an image of the product. In yet other embodiments of the invention, the product information is captured from tag on the product.

In further accord with embodiments of the invention, identifying the user is interested in the interaction with the product provider comprises receiving an interaction request from the user through interaction terminal.

In other embodiments of the invention, the physical indication of the user captured by the interaction terminal is an image of the user. In still other embodiments of the invention, the physical indication of the user captured by the interaction terminal is a sound of a voice of the user. In yet other embodiments of the invention, the physical indication of the user captured by the interaction terminal is a biometric reading from the user.

In further accord with embodiments of the invention, authentication of the user is further based on receiving authentication credentials from the user.

In other embodiments, the invention further comprises receiving a request from the user to use an alternate user resource pool for the interaction through the one or more interaction interfaces and illustrating a benefit of using the user resource pool for the interaction on the interaction terminal.

In still other embodiments, the invention further comprises receiving a request from the user to use an alternate user resource pool for the interaction through the one or more interaction interfaces and processing the interaction by transferring resources through traditional processing channels when the user requests to use the alternate user resource pool.

In yet other embodiments, the invention further comprises identifying when the user resource pool and the provider resource pool are administered by different organizations, processing the interaction by transferring resources through traditional processing channels.

To the accomplishment the foregoing and the related ends, the one or more embodiments comprise the features hereinafter described and particularly pointed out in the claims.

The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
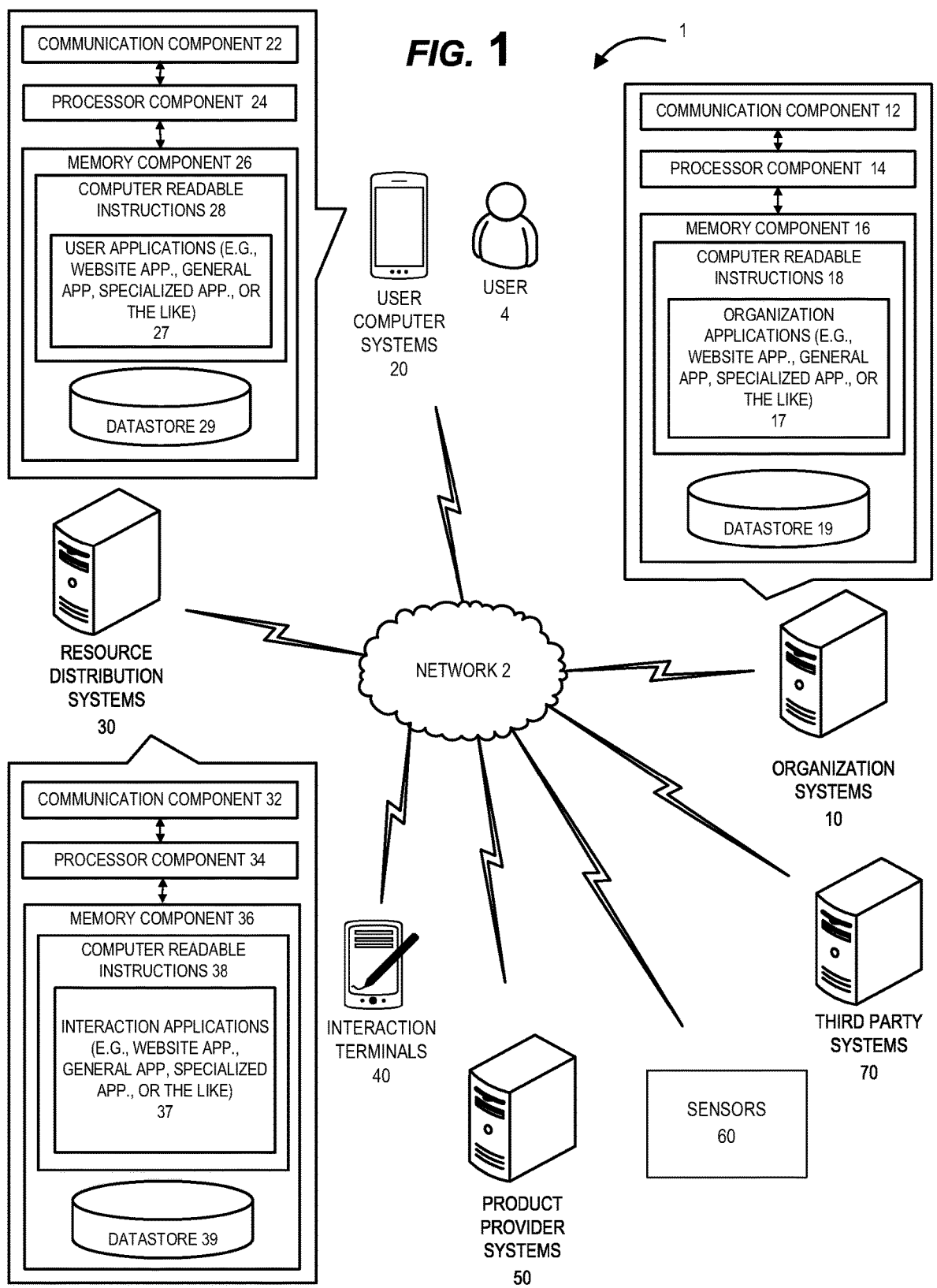

Having thus described embodiments of the invention in general terms, reference will now be made to the accompanying drawings, and wherein:

FIG. 1 illustrates a block diagram of a resource distribution platform system environment, in accordance with embodiments of the disclosure.

Figure 2:
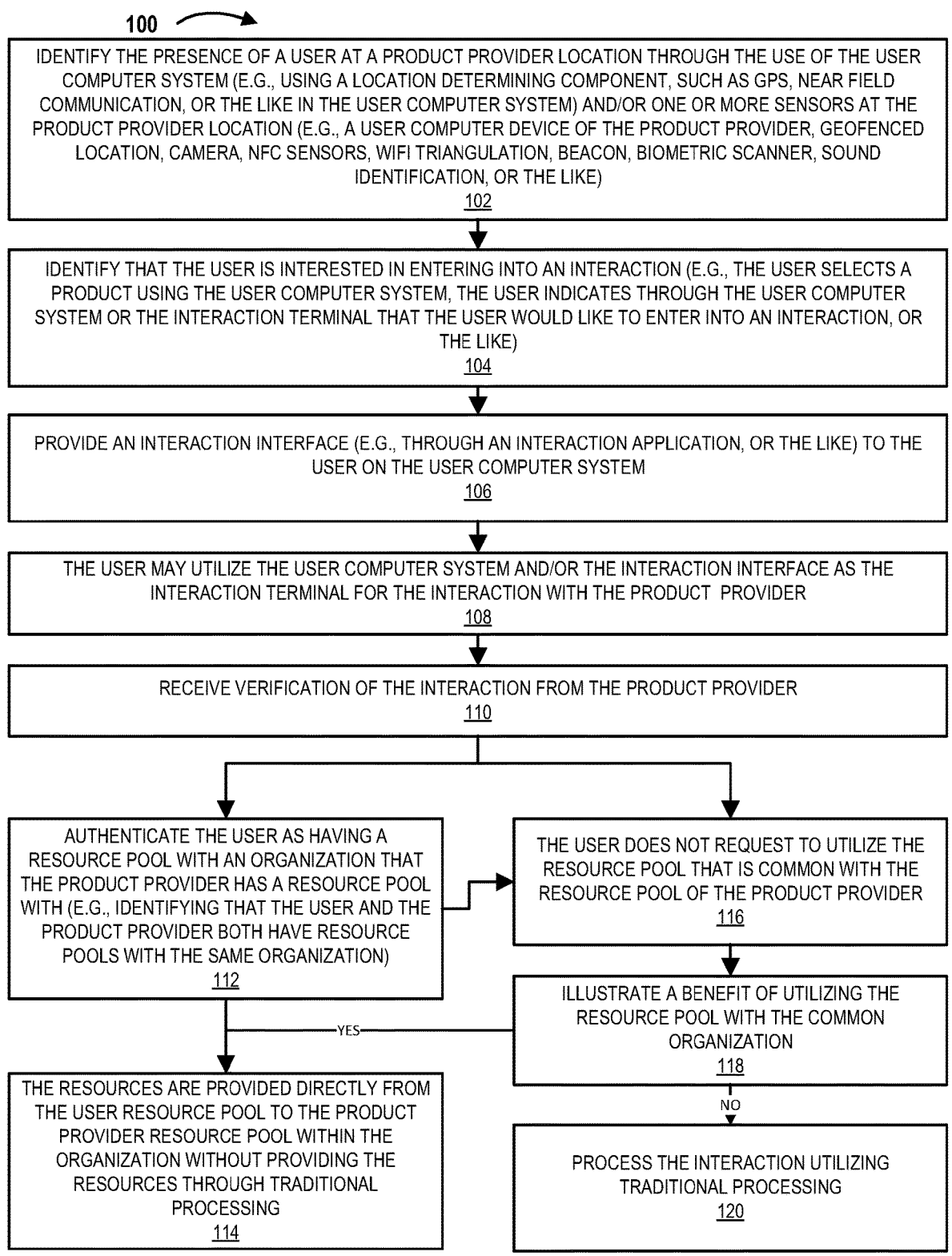

FIG. 2 illustrates a direct resource distribution process that utilizes a user computer system as the interaction terminal, in accordance with embodiments of the disclosure.

Figure 3:
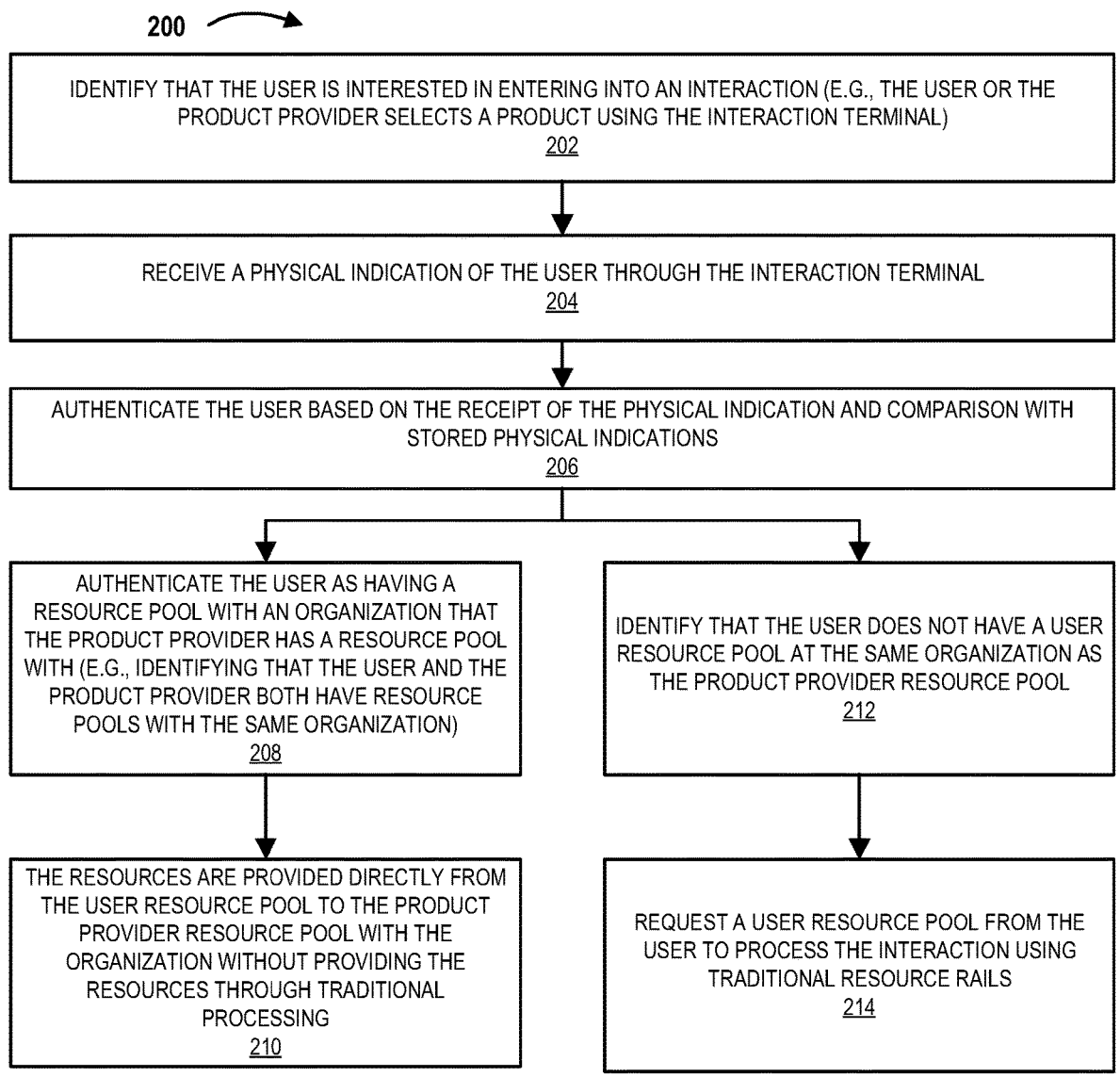

FIG. 3 illustrates a direct resource distribution process that utilizes an interaction terminal without the need for a user computer system and/or physical user instrument, in accordance with embodiments of the disclosure.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Systems, methods, and computer program products are herein disclosed for a resource distribution system that improves the processing speeds, memory storage, security, and reduces costs associated with processing resources related to interactions. In the present disclosure, the system creates a direct interaction network, wherein at least one resource pool source of the user (e.g., user resource pool) and at least one resource pool destination of a product provider (e.g., provider resource pool) are within the same organization. As such, the direct resource distribution network may be controlled by a single organization, which forms an internal resource transfer processing network. As such, resources associated with interactions may be distributed directly between the resource pools of the members within the direct resource distribution network without having to use the traditional processing networks (e.g., which have a number of issues related to processing times, memory, cost, or the like). For example, the system described herein allows for real-time or near real-time transfer of resources without having to wait for approval of such transfers through traditional processing networks; allows for reduced storage requirements because the details of each interaction and associated resource transfer do not have to be stored at each entity along the traditional processing networks; allows for improved security because details of the interaction are not touched by each entity within the traditional processing network; allows for improved security because the organization has insight into the identities of the parties engaged in the interaction; allows for improved resource transfer options because the organization has a view of both parties in the interaction, and thus can provide non-traditional resource transfer options; reduces the costs of resource transfers because the transfer is occurring within a single organization outside of the traditional processing networks; and allows for improved options for completing interactions between entities, such as without the need of interaction terminals and/or user computer systems or physical instruments.

It should be understood that user computer systems (e.g., mobile devices) and/or interaction terminals of product providers may be utilized to allow for the interactions between members of the interaction network. However, depending on the embodiments described herein the user computer systems of the user may become the interaction terminal without having to communicate with the interaction terminal of the product provider, or alternatively, the interaction terminal may be able to complete the interaction without the user having to utilize a user computer system and/or a physical instrument (e.g., card, or the like). For example, as will be described in further detail herein the organization (or a third party) may provide an application that allows a user to utilize the user computer system (e.g., mobile device) as the interaction terminal within a product provider location, thus eliminating the need for the product provider to have an interaction terminal. Alternatively, or additionally, the organization (or a third party) may provide an application that allows the interaction terminal to be utilized to identify and authorize the user for an interaction without the user having to present a user computer system and/or a physical instrument for the interaction.

FIG. 1 illustrates a resource distribution system environment 1, in accordance with embodiments of the invention. As illustrated in FIG. 1, one or more organization systems 10 are operatively coupled, via a network 2, to one or more user computer systems 20, one or more resource distribution systems 30, one or more interaction terminals 40, one or more product provider systems 50, one or more sensors 60, and/or one or more third party systems 70.

In this way, the one or more organization systems 10 may be the systems that run the applications that the organization uses within the organization's operations (e.g., that store and process interactions using resources from resource pools). The users 4 (e.g., one or more associates, employees, agents, contractors, sub-contractors, third-party representatives, customers, or the like), may include customers, employees of the product providers, employees of the organization, or the like. The users 4 may use the user computer systems 20 to communicate with the other systems and devices (e.g., interaction terminals 40) and/or components thereof. The one or more resource distribution systems 30 may be utilized to allow the users 4 to enter into direct interactions with the one or more product provider systems 50 through the one or more organization systems 10. In some embodiments the user computer systems 30 may act as the interaction terminal to enter the interactions without having to interact with the interaction terminals 40. In other embodiments, the interaction terminals 40 may facilitate the interactions between the users 4 and the product provider systems 50 without having to interact with the user computer systems 40 or a physical instrument of the user 4. The one or more sensors 40 (e.g., cameras, location sensors, geofencing, infrared, light curtains, or near field communication (NFC), WiFi triangulation, or the like) may be utilized in order to determine when a user enters the product provider location, the identity of the user 4, or the like. The third-party systems 70 may act as an intermediary between the various systems, which will be described in further detail herein.

As such, the users 4 (e.g., customers, or the like) may use the resources that the users 4 have with the organization to enter into interactions with the product providers, which may also have resources with the same organization. As such, the one or more user computer systems 20 may communicate with the one or more product provider systems 50 directly and/or through the direct resource distribution systems 30, through the interaction terminals 40, through one or more organization systems 10, and/or through third party systems 70 such that the interactions between the users 4, the organizations, and/or the product providers are completed more efficiently, timely, cost-effectively, and/or with reduced memory and processing speed requirements, as will be discussed in further detail herein.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components may include functionality to operate one or more software programs based on computer-readable instructions thereof, which may be stored in the one or more memory components.

The one or more processor components 14 use the one or more communication components 12 to communicate with the network 2 and other components on the network 2, such as, but not limited to, the one or more user computer systems 20, the one or more resource distribution systems 30, the one or more interaction terminals 40, the one or more product provider systems 50, the one or more sensors 60, the one or more third party systems 70, and/or other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to operate the organization, which may be internal and/or external applications). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for operating the organization (e.g., the external and/or internal operation of the organization), such as by communicating (e.g., interacting with) the one or more user computer systems 20 and user applications 27, the one or more resource distribution systems 30 and resource distribution applications 37, the one or more interaction terminals 40 (and applications thereof), the product provider systems 50 (and applications thereof), one or more sensors 60, the third party systems 70 (and applications thereof), and/or other systems (not illustrated). It should be understood that the one or more organization applications 17 may comprise the applications that are used by the organization to control, monitor, deliver, transfer, or the like, the resources of its customers (e.g., users and/or product provider systems, or the like).

As further illustrated in FIG. 1, the one or more user computer systems 20 are operatively coupled, via a network 2, to the one or more organization systems 10, the one or more resource distribution systems 30, the one or more interaction terminals 40, the one or more product provider systems 50, the one or more sensors 60, the one or more third party systems 70, and/or other systems. As illustrated in FIG. 1, users 4 may use the one or more resource distribution systems 30 and/or the one or more organization systems 10 to enter into interactions with one or more product provider systems 50 directly through the use of the user computer systems 20 or the interaction terminals 40 (e.g., one or the other), as will be described in further detail herein with respect to FIGS. 2 and 3.

It should be understood that the one or more user computer systems 20 may be any type of device, such as a desktop, mobile device (e.g., laptop, smartphone device, PDA, tablet, watch, wearable device, embedded device, or other mobile device), server, or any other type of system hardware that generally comprises one or more communication components 22, one or more processor components 24, one or more memory components 26, and/or the one or more user applications 27, such as web browser applications, dedicated applications, specialized applications, or portions thereof. The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more resource distribution systems 30, the one or more interaction terminals 40, the one or more product provider systems 50, the one or more sensors 60, the one or more third party systems 70, and/or other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and/or the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to perform the actions described herein (e.g., transfer resources directly using the user computer systems 20 as the interaction terminal, or through the interaction terminals 40, resource distribution systems 30, or the like).

As illustrated in FIG. 1, the one or more resource distribution systems 30 are operatively coupled, via a network 2, to the one or more organization systems 10, the one or more user computer systems 20, the one or more interaction terminals 40, the one or more product provider systems 50, the one or more sensors 60, the one or more third party systems 70, and/or the other systems. The one or more resource distribution systems 30, as will be described in further detail herein, may be utilized to facilitate direct resource interactions between users 4 and product providers through the one or more organization systems 10 directly with each other (instead of through traditional networks) that are more efficient, and thus, more cost effective, as will be discussed herein. It should be understood that the one or more resource distribution systems 30 may be a part of, and thus controlled by the organization, the product provider, or may be a part of a third party system. As such, the one or more resource distribution systems 30 may be supported by a third-party and/or by the organization.

The resource distribution systems 30 generally comprise one or more communication components 32, one or more processor components 34, and one or more memory components 36. The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, the one or more interaction terminals 40, the one or more product provider systems 50, the one or more third party systems 60, and/or the other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more resource distribution systems 30 may have computer-readable instructions 38 stored in the one or more memory components 36, which in some embodiments includes the computer-readable instructions 38 of one or more resource distribution applications 37 that allow the users 4 and product providers to enter into interactions using the user computer systems 20 or the interaction terminals 40 through the one or more organization systems 10 (or the one or more third party systems 70), as will be described herein.

Moreover, the one or more interaction terminals 40, the one or more product provider systems 50, the one or more sensors 60, the one or more third party systems 70, and/or other systems may be operatively coupled to and communicate with the one or more organization systems 10, the one or more user computer systems 20, and/or the one or more resource distribution systems 30, through the network 2. The one or more interaction terminals 40, the one or more product provider systems 50, the one or more sensors 60, the one or more third party systems 70, and the one or more other systems may have the same or similar components as the one or more organization systems 10, the one or more user computer systems 20, and/or the one or more resource distribution systems 30 (e.g., communication component, processor component, memory component—computer readable instructions for applications, datastore), and/or each other in the same or similar way as previously described with respect to the one or more organization systems 10, the one or more user computer systems 20, and/or the one or more resource distribution systems 30.

It should be understood that the one or more interaction terminals 40 may comprise any type of device or component thereof, such as a desktop, mobile device (e.g., laptop, smartphone device, PDA, tablet, watch, wearable device, embedded device, or other mobile device), server, wireless device, geo-fenced device, beacon, or any other type of system hardware, through which an interaction may occur. Moreover, it should be understood that the one or more interaction terminals 40 may be point of interaction devices (e.g., point of sale devices, or the like). As such, it should be understood that the one or more interaction terminals 40 may facilitate the direct resource distribution interactions, traditional resource interactions, or combinations thereof to allow for interactions between the users 4, product providers, and/or organizations. It should be understood that in some embodiments the one or more interaction terminals 40 may be owned and/or provided by the organization.

The one or more product provider systems 50 may comprise the systems that a product provider uses to enter into interactions with user 4. For example, the product provider may be a merchant that provides a product (e.g., goods or services) to users 4 during an interaction and collects resources through the one or more organization systems 10. It should be understood that both the user 4 and the product provider may have resource pools (e.g., accounts, or the like) with the organization, and as such, a direct interaction network may be created between the users 4, product providers, and/or one or more organizations (e.g., at which the users 4 and product providers have resource pools). Consequently, the direct interaction network may allow for the transfer of resources (e.g., in real-time, or the like) in response to an interaction without having to use traditional processing networks (e.g., processing channels through multiple entities, or the like) that are used for traditional transfer of resources. Traditional processing may include processing interactions through multiple entities, such as one or more entities that provide gateways for accessing the traditional processing networks, one or more entities for clearing houses, one or more entities for exchanges, one or more entities for worldwide processing, one or more entities for credit card processors, one or more entities for holding resources until the interaction is completed, or other like entities. The present invention by-passes these traditional processing networks, and thus, the direct resource distribution system environment 1 has improved processing speeds, reduced memory requirements for interactions (e.g., interaction details do not need to be stored with each entity along each processing network), improved efficiency (e.g., multiple systems and entities are cut of the interactions), improved security (e.g., much fewer entities touch—have access to—the interaction data, and the parties in the interaction are known parties by the organization and/or organizations) and/or reduced costs due to elimination of processing through entities through the traditional processing networks.

The one or more sensors 60 may be any type of sensor that is used to identify the presence of a user 4, an identity of the user, a product in which the user is interested, an indication from the user that the user would like to enter into an interaction for the product, or the like, as will be described in further detail herein. The one or more sensors 60 may include one or more of cameras, location sensors, geofencing, infrared, light curtains, near field communication (NFC), WiFi triangulation, RFID tags, or the like. In some embodiments, the one or more sensors 60, user computer systems 20, and/or the interaction terminals 40 may be able to create an interaction location (e.g., through a wired, wireless, or like component interaction) through which the interactions can occur between users 4, product providers, and the organization, as will be discussed in further detail herein.

The third party systems 70 may be systems of other organizations that may be part of the interaction network through which the traditional interactions may occur when direct interactions are not or cannot be utilized. For example, these may include the other organizations (e.g., resource organizations, or the like) that hold other resource pools of the users 4 and/or product providers. The third party systems 70 may also include system and/or application providers that facilitate the interactions directly between the user 4 resource pools and the product provider resource pools.

It should be understood that traditionally, product providers (e.g., merchants, or the like) set up an arrangement with an interaction processor that is an entry point into the channels for authorizing the transfer of resources, the collection of resources, and the movement of resources into product provider resource pools when users enter into interactions with the product providers. Furthermore, in some instances there is an additional resource transfer gateway process for e-commerce interactions. The resource transfer gateway ensures that the collection of information (e.g., resource pool information, user information, or the like) complies with regulatory and security mechanisms. The channels do not allow for simple encryption and storage, so many smaller product providers employ third parties to handle developing the components and processes needed to enter the interactions (e.g., instead of trying to develop and build out such systems internally).

It should be further understood that interactions and the associated resource transfers described herein may include "on-us" and "off-us" interactions. On-us interactions include interactions that only involve a single organization, such that resource transfers occur within the single organization (e.g., transferring resources between two different resource pools of a single user within a single institution, or transferring resources between resource pools of a first user and a product provider within the same organization, or the like). Alternatively, off-us interactions require other organizations to be involved (e.g., a second financial institution, other entities within the processing networks) in order to transfer resources between two resource pools at two different organizations. With respect to on-us interactions between users and product providers that both have resource pools with the same organization, the present invention allows these types of interactions to proceed without having to use the traditional processing networks. As such, in the present disclosure, the system creates a direct resource processing network, where the resource pool source of the user and the resource pool destination are both within the same organization.

Moreover, it should be understood that current resource transfer technology currently uses Internet based network processing to allow small sized product providers that typically operate using physical resources (e.g., food trucks, family owned stores, farmers market, tent vendors, or the like) to accept other forms of resource transfers (e.g., credit cards, debit cards, or the like). In some embodiments of the invention, the systems, and in particular, the user computer systems of the users 4 (e.g., a customer user or a product provider user) or an interaction terminal 40 of the product provider allow a user to transfer resources in association with interactions with the product provider, as will be described herein.

The present disclosure allows the use of a user computer system 30 as the interaction terminal, or an interaction terminal 40 and physical indication of the user to enter into and complete interactions without using traditional processing. The systems of the present disclosure increases the speed of the resource transfers, reduces the capacity needed to allow for the interactions, reduces the costs associated with traditional processing (e.g., cuts out the traditional entities through which the current resource transfers occur). For example, using an on-us or on-we, or other resource distribution network system, the system may allow a user 4 to use the interaction network for resource transfers in order to prevent the costs and other issues associated with traditional processing networks.

FIG. 2 illustrates a process flow for a direct resource distribution process, in accordance with some embodiments of the disclosure. FIG. 2 illustrates and discusses the situation in which the user computer system 20 of the customer user 4 may act as the interaction terminal for the interaction with the product provider. As illustrated by block 102 of FIG. 2, the system may identify the presence of a user 4 (e.g., customer user) at a product provider location. For example, the presence of the user 4 may be based on the user computer system 30 (e.g., mobile device, or the like) of the user and/or one or more sensors 60 at the product provider location. In some embodiments, the user computer system 20 may utilize a location determining component, such as but not limited to GPS, near field communication (NFC), WiFi, or the like to indicate the location of the user 4. The location of the user 20 may be identified by the resource distribution systems 30 and/or product provider systems 50 located at the product provider location or located remote from the product provider location, with or without the use of an interaction terminal 40 and/or the sensors 60 located at the product provider location. In some embodiments, the resource distribution systems 30 may identify the location of the user 4 with respect to product providers in real-time, when the user 4 activates a resource distribution application, when the user 4 activates location determination on the user computer system 20, or the like.

In other embodiments, the user 4 may be required to take a physical user action with respect to the user's user computer system 20 in order to indicate that the user is present at a location of a product provider. The physical user action may include the user scanning information (e.g., sign, barcode, or the like) on a product and/or within a product provider location. The physical user action may include the user selecting a feature within an application (e.g., organization application, product provider application, interaction application, and/or the like application, or portion thereof) on the user computer system 20, such as opening an application, selecting a button, opening up a product scanning feature, or the like). In other examples, the one or more sensors 60 may be used to identify the presence of a user 4 at the product provider location. For example, a camera, NFC, GPS, WiFi triangulation, beacon, biometric scanner, sound identification, geofenced area, or the like may be used to identify the presence of a user 4. The user 4 may be required to opt-in to allow the resource distribution system 30 and/or one or more sensors to identify the location of the user 4.

Consequently, in some embodiments, when the user 4 is identified as being located adjacent (e.g., near or at) the product provider location, the user 4 may receive a notification that the product provider at which the user 4 is located is a product provider that has resource pools with the same organization as the user (e.g., is a merchant that has accounts administered by the same organization that administers at least one user account). The notification may be any type of notification, including a pop-up, text, dropdown, or other like screen notification that appears on the user's user computer system (e.g., mobile device) as the user is located adjacent (e.g., near or within) a product provider location. The notification may be made through an interaction application (e.g., a portion or feature thereof) that is located on the user computer system (e.g., through an online banking application) of the user 4. For example, a traditional resource pool application of the user (e.g., online banking application) may provide notifications to the user 4 when the user 4 is located adjacent a product provider that has resource pools with the same institution. In other embodiments, the notification may be an e-mail notification, or any other type of notification within an application. Alternatively, the user may select a feature within the traditional resource application of the user (e.g., online banking application) to identify that the product provider has resource pools with the same entity. For example, a feature (e.g., an icon, button, menu, or the like) within an online banking account may be accessed in order to identify product providers that have resource pools with the same organization as the user (e.g., adjacent the location of the user, within a defined area—X-miles, collection of merchants on a street, town, city, or the like). In other embodiments, the user may scan signs or marketing material (e.g., using the user's mobile device) at the product provider location in order to access an interaction application for transferring resources directly to the product provider.

In some embodiments, not only is the presence of the user 4 at the product provider location identified, but the identity of the user 4 may also be identified. For example, it should be understood that if the user 4 has opted-in, the user 4 identity may be identified through the use of the user computer system 30, one or more sensors 60, and/or user information associated with the user 4 in the organization systems 10, resource distribution systems 30, product provider systems 50, and/or other systems. The identity of the user 4 may be utilized to determine if and when the user 4 has a user resource pool with the same organization with which the product provider has a provider resource pool, as described herein.

Block 104 of FIG. 2 further illustrates that the user 4 is identified as being interested in entering into an interaction with the product provider. The identification of the user 4 being interested in an interaction may be made in a number of ways. In some embodiments, the user 4 may select an "enter interaction" feature (e.g., a link, button, icon, menu, or the like) through the user computer system 20 or interaction terminal 40, or the like, or within an application thereof. In other examples, the user 4 may select a product for an interaction by scanning a product using the user computer system 20 or the interaction terminal 40, or a sensor 60 operatively coupled to either of the foregoing, selecting a feature for a product within an application on the user computer system 20 or the interaction terminal 40 (e.g., selecting product listed in the application using an application feature—link, button, icon, menu, or the like in an application), by moving a product (e.g., within the store as captured by a sensor 60 within the location and/or on the product), or the like.

FIG. 2 further illustrates in block 106 that an interaction interface for an interaction application may be provided to the user 4 on the user computer system 3. In some embodiments, one or more interaction interfaces of an interaction application may be used to identify the user 4 is interested in an interaction, as described with respect to block 104. Alternatively, the interaction interface may be presented to the user 4 after identifying that the user 4 is interested in an interaction. Regardless of when the interaction application is utilized, the interaction application may have one or more interfaces that allows the user 4 to enter into an interaction using a user resource pool. The interaction application may be a global interaction application that may be utilized by any product provider, or it may be a specific interaction application for the specific product provider. The interaction application may be provided by the organization, the product provider, and/or a third-party. With respect to a global interaction application, the product provider may be able to customize the global interaction application in order to provide customized information regarding the product provider's products. As discussed herein the interaction application may be utilized by a product provider (e.g., typically a small business, or the like) to enter into interactions with customers with or without the need for the product providers to have interaction terminals 40. As such, the user computer system 20 may be utilized on its own as the interaction terminal 40 through an interaction application. The interaction application may be an independent application that the user 4 may access on the user computer system 20, or the interaction application may be a component of an organization application 17 that the user 4 accesses to access the user resource pool, such as a feature of the user's online banking account application. For example, should the user 4 want to enter into an interaction with the product provider, the user 4 may open the interaction application, and either search for the product provider (e.g., using a keyboard, scan a sign—brand name, code, or the like) or be automatically displayed the product provider interface (e.g., based on the location of the user computer system, identification of the user 4, or the like).

Block 108 illustrates that the user 4 may utilize the user computer system 20 as the interaction terminal for the interaction with the product provider. For example, the interaction application and/or interaction interfaces thereof, may be used along with the user computer system 20 to select products, such as selecting products within a product interface in the interaction application, scanning physical products using the user computer system 20 (e.g., capturing a picture of the product, branding, barcode, product price, or the like), capturing information from products (e.g., moving the user device close to a product to capture information about the product wirelessly, such as through communication with a tag on the product—RFID, NFC, or the like), or the like. As such, the user computer system 30 may include an information capture component (e.g., a communication component 32, a camera, a reader, or the like) that the user may utilize to capture product information from products in order to enter into the interaction with the product provider. In this way, the product provider can utilize an application provided by the organization (or the third-party or product provider) to allow the user computer systems 20 to act as the interaction terminal for the product provider. As such, the product provider does not need its own interaction terminals 40 to enter into interactions with users 4. The user 4 can capture the product information from the product and enter into the interaction with the product provider. The product information may include the resource amount for the product, the product provider providing the product, product identifiers, or the like. Moreover, the user 4 may select the resource pool from which the user would like to utilize resources for the interaction for the product. In some embodiments, the product providers may require users 4 to enter into interactions using the user computer system 20. Alternatively, the user 4 may use the interaction application in order to bypass having to enter into an interaction with a product provider at a product provider interaction terminal 40 (e.g., to bypass a line of other customers, or the like).

As illustrated by block 110 in FIG. 2, the product provider (e.g., second user representing the product provider, such as an employee of the product provider, or the like) may be required to make an acceptance selection on the user computer system 20 of the customer, or on a user computer system 20 or interaction terminal 40 of the product provider. The acceptance selection may include the product provider providing a confirmation identifier to the user computer system 20 of the customer, or to a user computer system 20 or interaction terminal 40 of the product provider. The confirmation identifier may include a code from the product provider (e.g., a rotating code, interaction code, or the like displayed on the product provider interaction terminal 40 or employee computer system 20), a login and/or password for the product provider, or other confirmation identifier. Alternatively, in some embodiment no verification of the interaction from the product provider is required in order to allow the interaction to occur. Regardless of how the interaction is entered, an interaction conformation (e.g., receipt, code, or the like outlining the interaction information) may be provided to the user 4, the product provider, and/or the organization. For example, the interaction conformation may be sent to the user computer system 20, product provider system 50, and/or organization system 10. The interaction confirmation may be sent before or after resources have been transferred, and may be utilized by the user 4, product provider, and/or organization in order to account for the interaction (e.g., in account systems, record keeping, or the like) in the ledgers of each of the entities.

As illustrated by block 112 of FIG. 2, the user 4 may be authenticated as having a resource pool with one or more organizations with which the product provider has a resource pool. For example, should the user resource pool and the product provider resource pool both be administered by the same organization (e.g., accounts with the same financial institution) then traditional resource processing may be avoided. It should be understood that while block 112 is illustrated as occurring after receiving verification of the interaction between the user 4 and the product provider, it may occur at any point in the process, either before or after the user is identified as being present at the product provider location (e.g., before or after block 102). In some embodiments the user 4 may have user resource pools with multiple organizations and the product provider may have resource pools with multiple organizations. In some embodiments the system may determine the multiple organizations with which both entities in the interaction may have resource pools. When multiple resources pools are identified that may be used for the interaction, the system may automatically identify the resource pool to utilize based on user 4 and/or product provider preferences (e.g., a preferred resource pool that is pre-set by the user 4 and/or product provider). Alternatively, the system may request from the user 4 a resource pool to utilize, and thereafter, receive a selection from the user 4 and automatically use the provider resource pool with the same organization (or vice versa) to transfer the resources.

Block 114 of FIG. 2 further illustrates that should the user 4 and product provider have a resource pool with the same organization, and/or after receiving confirmation from the user 4 and/or product provider to enter into the interaction using the resource pool, the resources are provided directly from the user resource pool within the organization to the provider resource pool within the organization. As previously discussed herein, since both resource pools are administered (e.g., controlled, or the like) by the organization, the resource transfer between the user resource pool and product provider resource pool may be transferred immediately (e.g., near real-time) without incurring the additional capacity, memory, and/or costs that are required as a result of using traditional processing. Moreover, the interaction may be more secure than traditional interactions because the organization has insight into both entities of the interactions, and thus, is in a better position to determine if either one of the entities is a potential misappropriator.

FIG. 2 indicates in block 116 that the user 4 may request to utilize a resource pool that is not administered by an organization that also administers the product provider resource pool. FIG. 2 further illustrates in block 118, that when the user 4 does not select to use a resource pool at the same organization as the resource pool of the product provider, the interaction application may illustrate a benefit, in a benefit notification or in the interaction interface of the user 4, of using the user resource pool that is administered by the organization that administers the product provider resource pool. The benefit may include an offer (e.g., a discount, accessory product, points, rewards, or the like) that the user 4 may receive by using the user resource pool administered by the same organization that administers the product provider resource pool. Since transferring the resources directly between resource pools within the same organization by-passes traditional resource processing (e.g., and the costs associated therewith), the product provider and/or organization may be able to provide additional benefits to the user 4.

As illustrated by block 114 the interaction may be completed directly at the organization should the user 4 select to utilize the user resource pool for the interaction in order to receive the benefit. Alternatively, should the user 4 continue to utilize the other user resource pools and/or should the user resource pool and the product provider not be administered by the same organization, then the interaction may be processed through traditional processing, as illustrated by block 120 in FIG. 2 (e.g., third-party processing rails, clearing houses, transaction processing gateways, or the like), which increase the costs and processing times, and require additional processing capacity and memory in the system in order to complete the interaction.

Turning to FIG. 3, instead of using the user computer system 20 as the interaction terminal for the interaction between the user 4 and the product provider, the interaction may be completed between the user 4 and the product provider through the use of an interaction terminal 40 of the product provider without the use of a user computer system 20 and/or physical instrument provided by the user 4. For example, as illustrated by block 202 in FIG. 3, an identification may be made that a user 4 is interested in entering into an interaction with the product provider. For example, an interaction terminal 40 of the product provider may receive a selection of a product, selection of a feature to enter into an interaction, or the like. It should be understood that the interaction terminal 40 of the product provider may be a user computer system 20 of an employee of the product provider, a point of interaction terminal (e.g., point of sale device, or the like), one or more sensors 60, and/or the like, or combinations thereof. It should be further understood that the selection may be received in any number of ways through a customer user taking an action, product provider taking an action, and/or automatically through the use of one or more sensors 60. For example, the customer user 4 or the product provider (e.g., employee, or the like) may select the product through an interaction interface on the interaction terminal 40, such as scanning a product, placing the product near the interaction terminal 40 and/or a sensor 60, moving the product to a particular zone (e.g., interaction zone, or the like), taking a product off of a shelf, placing a product in a bin (e.g., cart, or the like), or the like, taking the product out of a product provider zone (e.g., walking the product out of the product provider location, designated area, or the like). The product may be identified based on the interaction terminal 40 and/or one or more sensors 60 capturing information form the product. For example, cameras may identify the product; RFID, NFC, or other tags may be used to identify the product; barcodes, QR code; or other indicia on the product may be used to identify the product, or the like.

Regardless of how the user is identified as being interested in entering an interaction for a particular product, block 204 of FIG. 3 illustrates that the system may receive a physical indication of the user through the interaction terminal 40 and/or one or more sensors 60 operatively coupled thereto. It should be understood that the physical indication may be any physical indication from the user 4 that does not require the user to utilize a user computer system 20 or a physical instrument (e.g., a card, fob, tag, or the like owned by the user). For example, the physical indication may be facial recognition of the user 4, voice confirmation of the user 4, and/or other biometric identification (e.g., fingerprint, palm print, hand geometry, ear geometry, retina or iris patterns, hand movement gestures, or the like) that is captured by the interaction terminal 40 or one or more sensors 60 operatively coupled to the interaction terminal 40. In some embodiments, the physical indication (or combinations of two or more physical indications) may be requested from the user 4 in order to enter into the interaction. In other embodiments, one or more physical indications may be provided along with other authentication credentials, such as but not limited passwords, pins, user location information (e.g., GPS of user computer system 20), or the like. However, it should be understood that the interaction may be entered into by the user 4 without the need for a user computer system 20 or physical instrument. The user 4 may opt-in to allow for the use of the physical indication to enter into interactions. For example, the user 4 may provide a particular recorded phrase, facial recognition scan, fingerprint scan and/or other pre-defined biometric reading that may be stored for use as authentication of the user 4 for the interaction. Furthermore, the user 4 may be able to set the type of one or more physical indications required to enter into an interaction, and/or the limits on what interaction may be entered using the one or more physical indications (e.g., limits on resource amount, frequency, product, product provider, or the like with which the interaction would be allowed). For example, for some interactions, the user 4 may allow only facial recognition or voice recognition to enter into the interaction; however, other types of interactions may be required to have both facial recognition and voice recognition.

Block 206 of FIG. 3 illustrates that the user 4 is authenticated through the use of the physical indication received (e.g., by the interaction terminal 40, the one or more sensors 60, or the like). For example, the physical indication received by the user 4 may be compared with pre-defined stored interaction requirements. The stored interaction requirements may be stored with the organization, product provider, or a third party. In some embodiments, using a physical indication from a user 4 for authentication may only be allowed when the user 4 has a user resource pool at the same organization with which the product provider has a provider resource pool. In this way the organization is more confident that the entities entering the interaction are authorized because the organization has insight into the interactions of each entity.

As illustrated by block 208 in FIG. 3, during or after authenticating the user 4 through the use of the physical indication received from the user 4, the system may also authenticate that the user has a resource pool (e.g., user resource pool) with an organization with which the product provider also has a resource pool (e.g., provider resource pool) as previously discussed with respect block 112 of FIG. 2.

As previously described with respect to block 114 of FIG. 2, as illustrated by block 210 of FIG. 3, the resources are provided directly from the user resource pool to the product provider resource pool within the organization (e.g., in real-time, such as instantaneously or near real-time) without providing the resources through traditional processing rails.

As previously described herein, regardless of how the interaction is entered, an interaction conformation (e.g., receipt, code, or the like outlining the interaction information) may be provided to the user 4, the product provider, and/or the organization. For example, the interaction conformation may be sent to the user computer system 20 (e.g., not present at the interaction), product provider system 50, and/or organization system 10. The interaction confirmation may be sent before or after resources have been transferred, and may be utilized by the user 4, product provider, and/or organization in order to account for the interaction (e.g., in account systems, record keeping, or the like) in the ledgers of each of the entities. In some embodiments the interaction conformation may be displayed to the user 4 on the interaction terminal 40 of the product provider in order to confirm the interaction to the user 4.

Returning to block 212 of FIG. 3, a determination may be made that the user cannot be authenticated as having a user resource pool at the same organization with which the product provider has a provider resource pool. For example, while the user 4 may have multiple resource pools with different organizations, a situation may occur in which the user 4 may not have a resource pool with the same organization as the product provider (or may not have the resources in the resource pool to enter into the interactions). Consequently, as illustrated by block 214 the system may require a user 4 to select a user resource pool (e.g., through the interaction terminal 40), present use resource pool through a user computer system 20 (e.g., a resource pool from a digital wallet), and/or present a physical instrument (e.g., credit card, or the like) which the user 4 would like to utilize for the interaction. Thereafter, the resource transfer may occur through the use of traditional processing rails.

It should be understood that the present invention can be used for any user 4 (e.g., customers) and any product provider (e.g., merchants). However, it should be understood that the interaction network may be especially beneficial for small businesses, business that typically utilize cash, and/or groups of small businesses. Small businesses do not have the resources to build out the systems and applications for in-person and/or e-commerce interactions between the users 4 and the small businesses. As such, small businesses typically have to contract with and/or interact with multiple third parties to complete the interactions with users 4, which increases the time it takes to complete resource transfers associated with interactions (e.g., may take days for resource transfers to clear), increases the costs for the small businesses (e.g., payments have to be made to each of the third parties along the traditional processing rails), and requires storage of the interaction and resource transfer details along the various processing entities, which increases the amount of memory storage for each interaction. Unlike traditional processing, the present invention provides a direct resource transfer system that does not require the businesses to contract with and/or interact with multiple third parties to complete the interactions with users 4, which decreases the time it takes to complete resource transfers (e.g., may occur in real-time or near-real time), decreases the costs for the businesses (e.g., payments occur directly between accounts at the same institution outside of traditional processing rails), reduces storage requirements because the interactions and resource transfer details only need to be stored at the organization that holds the resource pools, and/or improves security because the organization has a relationship with each entity in the interaction (e.g., users have user resource pools and product providers have product provider pools with the same organization). As such, the present invention provides improvements over traditional interaction systems.

It should be understood that the systems described herein may be configured to establish a communication link (e.g., electronic link, or the like) with each other in order to accomplish the steps of the processes described herein. The link may be an internal link within the same entity (e.g., within the same organization) or a link with the other systems. In some embodiments, the one or more systems may be configured for selectively responding to dynamic inquires. These feeds may be provided via wireless network path portions through the Internet. When the systems are not providing data, transforming data, transmitting the data, and/or creating the reports, the systems need not be transmitting data over the Internet, although they could be. The systems and associated data for each of the systems may be made continuously available, however, continuously available does not necessarily mean that the systems actually continuously generate data, but that systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

To supplement the present disclosure, this application further incorporates entirely by reference the commonly assigned patent application Ser. No. 16/673,392, entitled "Direct Resource Distribution System", which is filed concurrently herewith.

What is claimed is:

1. A direct resource distribution system for transferring resources between entities, the system comprising:
    one or more memory components having computer readable code stored thereon; and
    one or more processing components operatively coupled to the one or more memory components, wherein the one or more processing components are configured to execute the computer readable code to:
        identify that a user is interested in an interaction with a product provider;
        identify the user based on a physical indication of the user located adjacent an interaction terminal without a user computer system or physical resource instrument, wherein the interaction terminal is a product provider interaction terminal located at a product provider store, wherein the physical indication is captured by one or more sensors of the interaction terminal, wherein the user has set the physical indication for entering into interactions using the physical indication;
        authenticate the user based on comparing the physical indication of the user with stored physical indication for the user;
        identify when the user has a user resource pool and the product provider has a provider resource pool with a third party organization that administers the user resource pool and the provider resource pool, wherein the user resource pool is a user financial account and the provider resource pool is a provider financial account, and the third party organization is a financial institution;
        transmit a benefit notification to the product provider interaction terminal, wherein the benefit notification comprises a discount, accessory product, points, or rewards, for using the user resource pool that is administered by the third party organization that administers the provider resource pool;
        in response to authenticating the user and identifying the user resource pool and the provider resource pool are both administered by the third party organization, process the interaction by instantaneously transferring the resources directly between the user resource pool and the provider resource pool;
        in response to failing to authenticate the user based on the physical indication or identifying the user resource pool and the provider resource pool are administered by different organizations, request a resource pool from the user to enter into the interaction; and
        in response to receiving the resource pool from the user, process the interaction by transferring the resources through traditional processing channels.

2. The system of claim 1, wherein identifying the user is interested in the interaction with the product provider comprises receiving product information captured from a product scanned using the interaction terminal.

3. The system of claim 1, wherein identifying the user is interested in the interaction with the product provider comprises receiving product information from a product.

4. The system of claim 3, wherein the product information is captured from an image of the product.

5. The system of claim 3, wherein the product information is captured from a tag on the product.

6. The system of claim 1, wherein identifying the user is interested in the interaction with the product provider comprises receiving an interaction request from the user through the interaction terminal.

7. The system of claim 1, wherein the physical indication of the user captured by the interaction terminal is an image of the user, a sound of a voice of the user, or a biometric reading from the user.

8. The system of claim 1, wherein two or more physical indicators are required when a resource amount, interaction frequency, or a product provider type is met for one or more user interactions.

9. The system of claim 8, wherein the user sets the two or more physical indicators.

10. The system of claim 1, wherein authentication of the user is further based on receiving authentication credentials from the user.

11. The system of claim 1, wherein the one or more processing components are further configured to execute the computer readable code to:
    receive a request from the user to use an alternate user resource pool for the interaction through one or more interaction interfaces; and illustrate a benefit of using the user resource pool for the interaction on the interaction terminal.

12. The system of claim 1, wherein the one or more processing components are further configured to execute the computer readable code to:
receive a request from the user to use an alternate user resource pool for the interaction through one or more interaction interfaces; and
process the interaction by transferring the resources through traditional processing channels when the user requests to use the alternate user resource pool.

13. A computer implemented method for transferring resources between entities, the method comprising:
providing one or more processors configured with instructions;
executing, by the one or more processors, the instructions comprising:
identifying, by the one or more processor components, that the user is interested in an interaction with a product provider;
identifying, by the one or more processor components, a user based on a physical indication of the user located adjacent an interaction terminal without a user computer system or physical resource instrument, wherein the interaction terminal is a product provider interaction terminal located at a product provider store, wherein the physical indication is captured by one or more sensors of the interaction terminal, wherein the user has set the physical indication for entering into interactions using the physical indication;
authenticating, by the one or more processor components, the user based on comparing the physical indication of the user with stored physical indication for the user;
identifying, by the one or more processor components, when the user has a user resource pool and the product provider has a provider resource pool with a third party organization that administers the user resource pool and the provider resource pool, wherein the user resource pool is a user financial account and the provider resource pool is a provider financial account, and the third party organization is a financial institution;
transmitting, by the one or more processor components, a benefit notification to the product provider interaction terminal, wherein the benefit notification comprises a discount, accessory product, points, or rewards, for using the user resource pool that is administered by the third party organization that administers the product provider resource pool;
in response to authenticating the user and identifying the user resource pool and the provider resource pool are both administered by the third party organization, processing, by the one or more processor components, the interaction by instantaneously transferring the resources directly between the user resource pool and the provider resource pool;
in response to failing to authenticate the user based on the physical indication or identifying the user resource pool and the provider resource pool are administered by different organizations, requesting, by the one or more processors, a resource pool from the user to enter into the interaction; and
in response to receiving the resource pool from the user, processing, by the one or more processor components, the interaction by transferring the resources through traditional processing channels.

14. The method of claim 13, wherein identifying the user is interested in the interaction with the product provider comprises receiving product information captured from a product scanned using the interaction terminal.

15. The method of claim 13, wherein identifying the user is interested in the interaction with the product provider comprises receiving product information from an image of a product or from a tag on the product.

16. The method of claim 13, wherein identifying the user is interested in the interaction with the product provider comprises receiving an interaction request from the user through the interaction terminal.

17. The method of claim 13, wherein the physical indication of the user captured by the interaction terminal is an image of the user, is a sound of a voice of the user, or is a biometric reading from the user.

18. The method of claim 13, the instructions further comprising:
receiving, by the one or more processor components, a request from the user to use an alternate user resource pool for the interaction through one or more interaction interfaces; and
illustrating, by the one or more processor components, a benefit of using the user resource pool for the interaction on the interaction terminal.

19. A computer program product for transferring resources between entities, the computer program product comprising at least one non-transitory computer-readable medium having computer-readable program code portions embodied therein, the computer-readable program code portions comprising:
an executable portion configured to identify that the user is interested in an interaction with a product provider;
an executable portion configured to identify the user based on a physical indication of the user located adjacent an interaction terminal without a user computer system or physical resource instrument, wherein the interaction terminal is a product provider interaction terminal located at a product provider store, wherein the physical indication is captured by one or more sensors of the interaction terminal wherein the user has set the physical indication for entering into interactions using the physical indication;
an executable portion configured to authenticate the user based on comparing the physical indication of the user with stored physical indication for the user;
an executable portion configured to identify when the user has a user resource pool and the product provider has a provider resource pool with a third party organization that administers the user resource pool and the provider resource pool, wherein the user resource pool is a user financial account and the provider resource pool is a provider financial account, and the third party organization is a financial institution;
an executable portion configured to transmit a benefit notification to the product provider interaction terminal, wherein the benefit notification comprises a discount, accessory product, points, or rewards, for using the user resource pool that is administered by the third party organization that administers the provider resource pool;
an executable portion configured to, in response to authenticating the user and identifying the user resource pool and the provider resource pool are both administered by the third party organization, process the interaction by instantaneously transferring the resources directly between the user resource pool and the provider resource pool;

an executable portion configured to, in response to failing to authenticate the user based on the physical indication or identifying the user resource pool and the provider resource pool are administered by the different organizations, request a resource pool from the user to enter into the interaction; and an executable portion configured to, in response to receiving the resource pool from the user, process the interaction by transferring the resources through traditional processing channels.

20. The computer program product of claim 19, wherein the computer-readable program code portions further comprise:

an executable portion configured to receive a request from the user to use an alternate user resource pool for the interaction through one or more interaction interfaces; and an executable portion configured to illustrate a benefit of using the user resource pool for the interaction on the interaction terminal.

\* \* \* \* \*